(12) United States Patent
Park et al.

(10) Patent No.: US 7,634,014 B2
(45) Date of Patent: Dec. 15, 2009

(54) ADAPTIVE PILOT ALLOCATION METHOD AND APPARATUS FOR USE IN A COMMUNICATION SYSTEM

(75) Inventors: Min-Cheol Park, Suwon-si (KR); Yun-Sang Park, Suwon-si (KR); Bong-Gee Song, Seongnam-si (KR); Tae-Gon Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 614 days.

(21) Appl. No.: 11/325,125

(22) Filed: Jan. 4, 2006

(65) Prior Publication Data

US 2006/0146948 A1     Jul. 6, 2006

(30) Foreign Application Priority Data

Jan. 4, 2005     (KR) .................... 10-2005-0000582

(51) Int. Cl.
 *H04K 1/10* (2006.01)
(52) U.S. Cl. ....................................... 375/260; 370/335
(58) Field of Classification Search ................ 375/260, 375/141, 220; 370/342, 335, 320
See application file for complete search history.

(56) References Cited

U.S. PATENT DOCUMENTS

| | | | |
|---|---|---|---|
| 6,385,183 B1* | 5/2002 | Takeo | 370/335 |
| 6,731,622 B1* | 5/2004 | Frank et al. | 370/342 |
| 2002/0004920 A1* | 1/2002 | Cho et al. | 714/704 |
| 2003/0099303 A1* | 5/2003 | Birru et al. | 375/265 |
| 2005/0135324 A1* | 6/2005 | Kim et al. | 370/343 |
| 2007/0104174 A1* | 5/2007 | Nystrom et al. | 370/343 |
| 2008/0137562 A1* | 6/2008 | Li et al. | 370/280 |
| 2008/0167049 A1* | 7/2008 | Karr et al. | 455/456.2 |
| 2008/0279306 A1* | 11/2008 | van Zelst et al. | 375/296 |

FOREIGN PATENT DOCUMENTS

WO     WO 2004/056022     7/2004

\* cited by examiner

*Primary Examiner*—Emmanuel Bayard
(74) *Attorney, Agent, or Firm*—The Farrell Law Firm, LLP

(57) ABSTRACT

A method and apparatus are provided for adaptively allocating pilots in a pilot-aided channel estimation system. A multipath delay is measured between a base station (BS) and a mobile station (MS). A distribution density of pilots of a signal to be transmitted between the BS and the MS is controlled. When the multipath delay is large, the pilot distribution density is relatively raised. However, when the multipath delay is small, the pilot distribution density is relatively lowered. The pilot distribution density is adaptively controlled according to the multipath delay, such that resources are effectively utilized and throughput is improved.

14 Claims, 10 Drawing Sheets

■ : PILOT
□ : DATA ated on Jun. 19, 2004. Korean Patent Publication
ADAPTIVE PILOT ALLOCATION METHOD AND APPARATUS FOR USE IN A COMMUNICATION SYSTEM

PRIORITY

This application claims priority to an application filed in the Korean Intellectual Property Office on Jan. 4, 2005 and assigned Ser. No. 2005-582, the contents of which are incorporated herein by reference.

BACKGROUND OF THE INVENTION

1. Field of the Invention

The present invention relates generally to a communication system, and more particularly to a method and apparatus for adaptively allocating pilots according to a change in a channel environment.

2. Description of the Related Art

A receiving side of an orthogonal frequency division multiplexing (OFDM) system must perform channel estimation for coherent detection to compensate for distortion due to channel fading. The receiving side estimates characteristics of a channel by which a signal is transmitted and compensates for the distortion due to the channel fading. Accordingly, a transmitting side transmits a pilot signal known by the receiving side through predetermined subcarriers. The receiving side performs the channel estimation using the pilot signal associated with subcarriers by which data is transmitted.

When a large number of pilots are used, an accurate channel estimate can be determined. However, for this case, many subcarriers are used to transmit pilots rather than data. Therefore, the increased number of pilots causes an overhead and reduces valuable data transmission resources.

Various techniques are used to allocate pilots in an orthogonal frequency division multiplexing (OFDM) system. For example, a predetermined number of pilots are fixedly arranged in an entire frame as illustrated in FIG. 1 which illustrates the arrangement of pilots in a downlink frame to be transmitted from a base station (BS) to a mobile station (MS) in the OFDM system.

Referring to FIG. 1, a frame structure includes an OFDM symbol (hereinafter, referred to as a "symbol") used for a preamble, symbols of a common message region subsequent to the preamble symbol, and symbols of a data burst region subsequent to the symbols of the common message region. The symbols of the common message region are used to transmit information to be commonly received by all MSs, and the symbols of the data burst region are used to transmit traffic data from the BS to the MS. In FIG. 1, the short arrows arranged along the subcarrier axis indicate pilots. It can be seen from FIG. 1 that a predetermined number of pilots are fixedly arranged in the data burst region as well as in the preamble and the common message region.

The frame structure in which a predetermined number of pilots are fixedly arranged (as illustrated in FIG. 1) has been designed by taking into account the worst channel environment in a system. When pilots are mapped by accommodating the worst channel environment, channel estimation is also possible under a better channel environment. Even when a small number of pilots are used under the better channel environment, the channel estimation is possible. However, when pilot mapping used for the worst channel environment is also used for the better channel environment, an excessive number of pilots are used.

When the number of pilots appropriate for the worst channel environment is fixed in the data burst region of a better channel environment, data transmission resources are reduced by the number of excessively allocated pilots. As a result, this overhead that reduces the total throughput.

A technique for reducing the overhead is disclosed in Korean Patent Publication No. 10-2004-0051904 entitled "Method and Apparatus for Signal Constitution for Downlink of OFDMA Based Cellular Systems" filed on Dec. 13, 2002, and laid-open on Jun. 19, 2004. Korean Patent Publication No. 10-2004-0051904 discloses a technique for reducing an overhead and transmission power for a pilot symbol in a downlink, and assigning adaptive pilot symbols and allocating subcarriers to increase the total data transmission capacity. According to the disclosed technique, the number of pilots assigned on the time axis is different in a downlink according to a moving speed of a user and the number of antennas used. Additional pilots are assigned for users traveling at higher speeds. Accordingly, the overhead due to pilots is reduced, the total data transmission rate is increased, and power consumption required for transmitting pilots is reduced.

A channel environment in the OFDM system is different according to a multipath delay as well as a moving speed of a user. More specifically, when the speed of a user increases, the Doppler effect becomes large and fading channel is fluctuated according to time. When it is assumed that users communicate with each other in the non-moving or low speed state, a difference in the channel environment between the users is largely a multipath delay.

It is preferred that pilots are adaptively allocated according to a multipath delay such that the total throughput is improved by allocating an appropriate number of pilots according to a channel environment to effectively utilize subcarriers.

SUMMARY OF THE INVENTION

Therefore, it is an aspect of the present invention to provide a method and apparatus that effectively utilize resources by adaptively allocating pilots according to a multipath delay.

The above and other aspects of the present invention can be achieved by measuring a multipath delay between a base station (BS) and a mobile station (MS) and controlling a distribution density of pilots of a signal to be transmitted between the BS and the MS, relatively raising the pilot distribution density when the multipath delay is large, and relatively lowering the pilot distribution density when the multipath delay is small.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, a detailed description of known functions and configurations incorporated herein will be omitted for conciseness.

Figure 1:
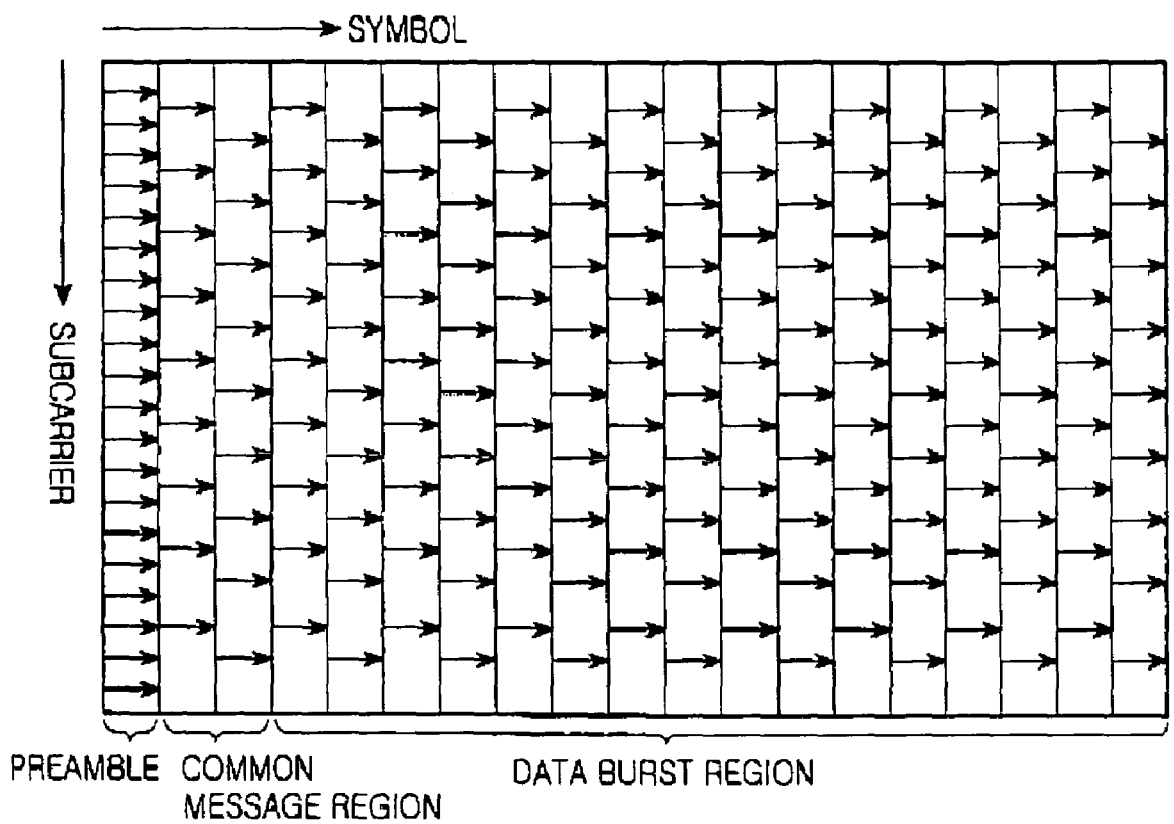
FIG. 1 illustrates a downlink frame structure based on the conventional arrangement of pilots.
Figure 2:
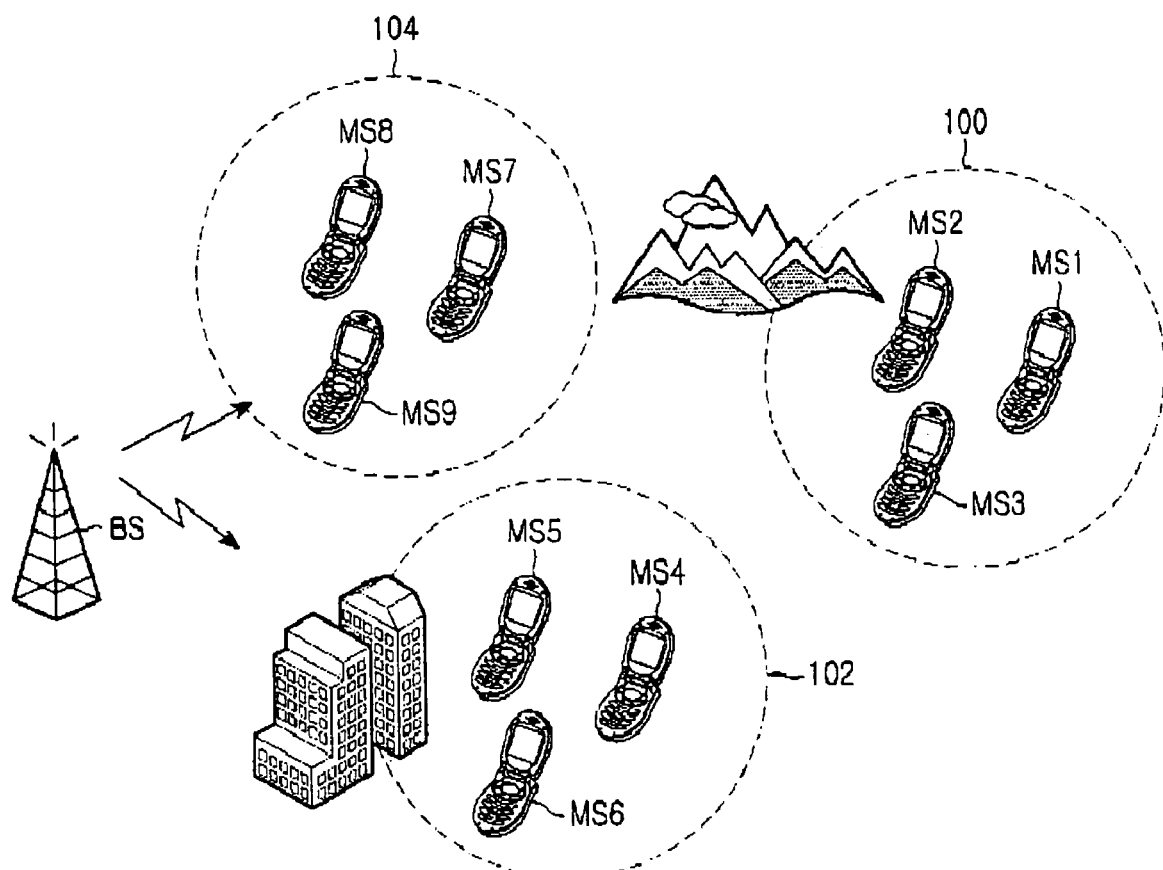
FIG. 2 illustrates an example of grouping mobile stations (MSs) on a channel environment-by-environment basis in accordance with an embodiment of the present invention.

FIG. 2 illustrates an example of grouping mobile stations (MSs) on a channel environment-by-environment basis in accordance with an embodiment of the present invention. MS1 to MS9 communicating with a base station (BS) are grouped into three groups 100, 102, and 104 according to channel environments having similar multipath delays. MS1 to MS3 of the group 100 perform a communication function in a channel environment having the largest multipath delay. MS7 to MS9 of the group 104 perform a communication function in a channel environment having the smallest multipath delay. MS4 to MS6 of the group 102 perform a communication function in a channel environment having a median multipath delay between the largest multipath delay of the group 100 and the smallest multipath delay of the group 104. Of course, the MSs belonging to the same group 100, 102, or 104 have slightly different multipath delays, but the MSs having similar multipath delay values within a defined range are included in the same group.

In accordance with an embodiment of the present invention, each of the MS1 to MS9 measures a multipath delay from a signal transmitted by the BS, and controls a pilot distribution density of a signal to be transmitted to the BS, that is, a pilot distribution density of an uplink frame, correspondingly to its own multipath delay size. Similarly, the BS controls a pilot distribution density of a signal to be transmitted to MS1 to MS9 of the groups 100, 102, and 104 having different multipath delays, that is, a pilot distribution density of a downlink frame, according to a group-by-group or MS-by-MS multipath delay size in accordance with an embodiment of the present invention.

Figure 3A:
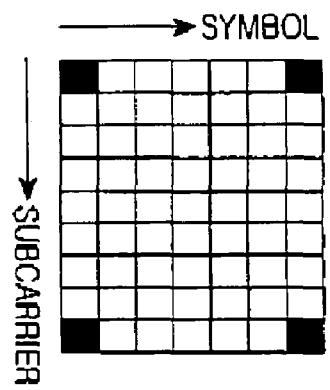
FIGS. 3A-3C illustrate examples of channel environment-by-environment pilot patterns in accordance with an embodiment of the present invention.
Figure 3B:
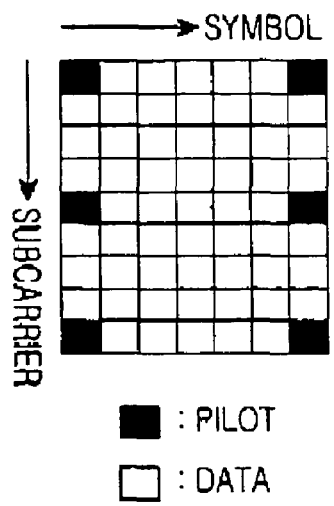
Figure 3C:
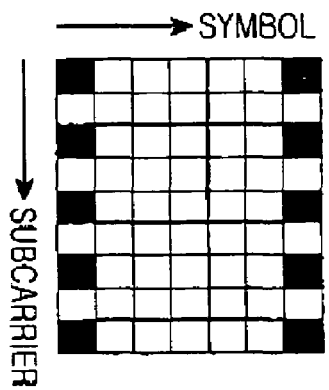

FIGS. 3A-3C illustrate examples of channel environment-by-environment pilot patterns in accordance with an embodiment of the present invention. For example, three pilot patterns are defined as illustrated in FIGS. 3A-3C for convenience such that the present invention can be better understood. The three pilot patterns are classified according to multipath delay sizes, that is, a relatively large multipath delay size, a relatively small multipath delay size, and a median multipath delay size. The pilot patterns have different pilot distribution densities according to the multipath delay sizes. Of course, the pilot patterns can be defined in detail according to multipath delay sizes. In FIGS. 3A-3C, "■" denotes a pilot tone, that is, a subcarrier mapped to a pilot, and "□" denotes a data tone, that is, a subcarrier mapped to data.

FIG. 3A illustrates a pilot pattern used when the multipath delay is small, FIG. 3B illustrates a pilot pattern used when the multipath delay size is middle, and FIG. 3C illustrates a pilot pattern used when the multipath delay is large. As illustrated in FIGS. 3A to 3C, the pilot distribution density is set to be high when the multipath delay is large. According to the conventional technique disclosed in the above-mentioned Korean Patent Publication No. 10-2004-0051904, the number of pilots assigned along the time axis, that is, the symbol axis, is different according to a user's moving speed. However, according to FIGS. 3A to 3C, the pilot distribution density, that is, the number of pilots allocated along the subcarrier axis, is different according to a multipath delay size.

Multipath delay sizes and pilot patterns mapped thereto are identically preset in both of the MS and the BS. Values of the number of pilot patterns and the pilot distribution density have trade-off characteristics related to performance and implementation complexity. Accordingly, a value of the number of pilot patterns and a value of the pilot distribution density can be adaptively selected according to a system to which the present invention is applied.

That is, an appropriate number of pilots need to be allocated such that a channel having a corresponding multipath delay can be estimated. For example, even when one pilot is allocated to a subcarrier, a channel value of the entire band in a flat fading channel serving as the best case in which the multipath delay is small can be estimated. A small number of pilots in the flat fading channel can be allocated for the MS. However, channel estimation in the worst case, is possible when a large number of pilots are allocated to a subcarrier. The best case can increase the throughput as compared with the worst case, because the unused pilot subcarriers can be used to transmit data and thus increase an amount of data capable of being transmitted.

Figure 4A:
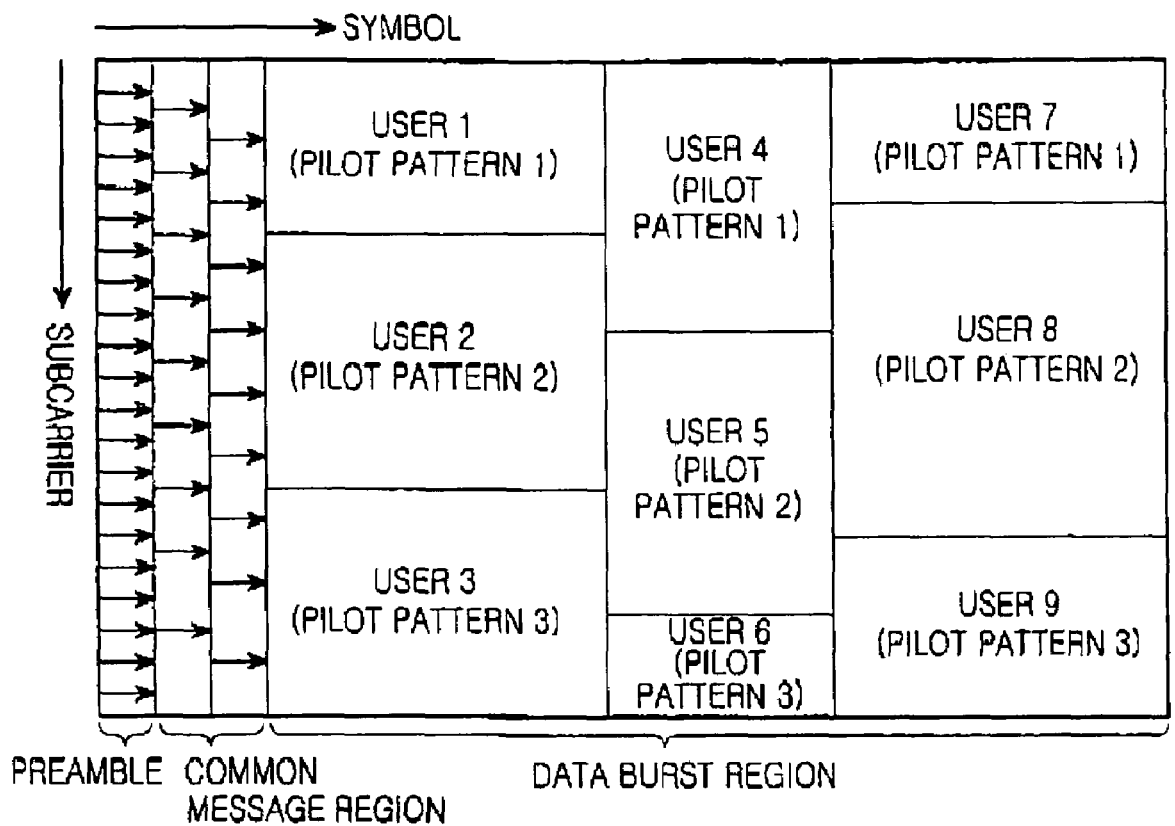
FIGS. 4A and 4B illustrate examples of downlink and uplink frame structures based on pilot patterns allocated on a user-by-user basis in accordance with embodiments of the present invention, respectively.
Figure 4B:
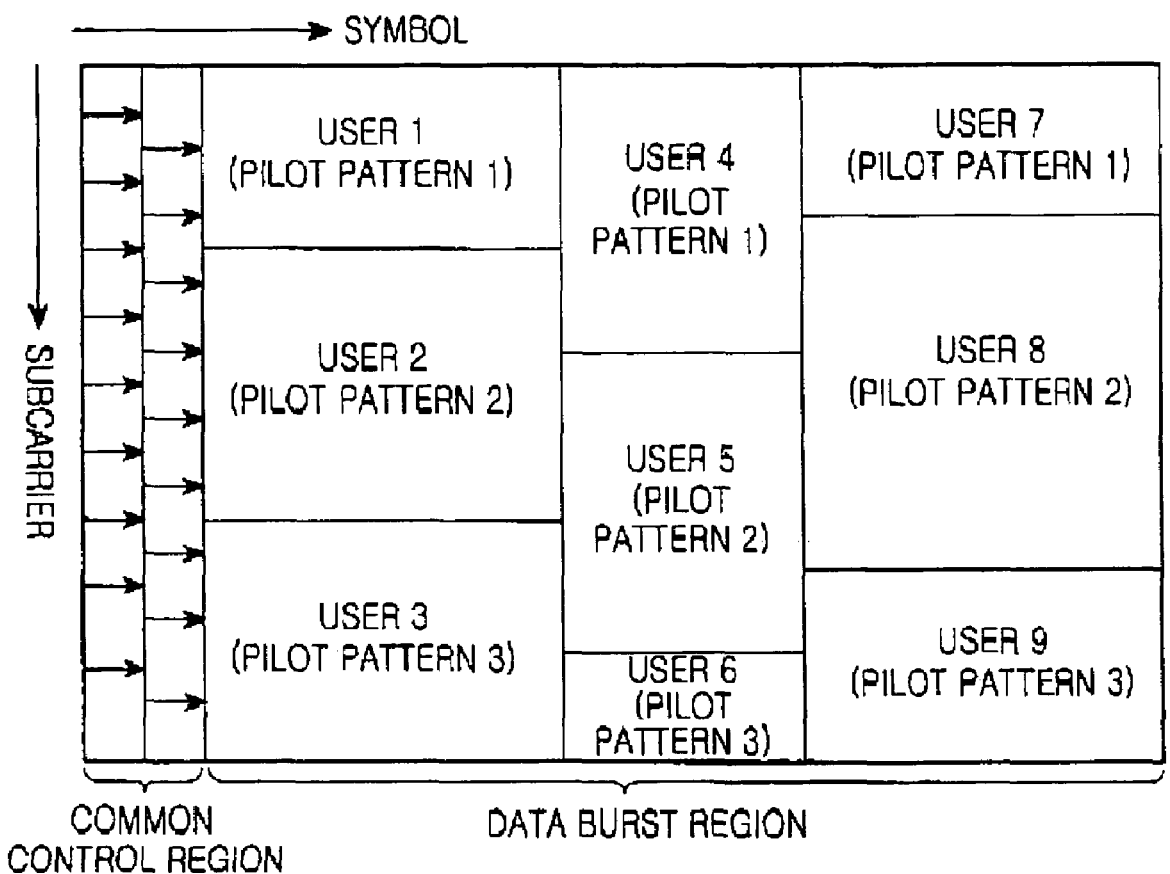

FIG. 4A illustrates an example of a downlink frame structure based on pilot patterns allocated on a user-by-user basis in accordance with an embodiment of the present invention, and FIG. 4B illustrate an example of an uplink frame structure based on pilot patterns allocated on the user-by-user basis in accordance with an embodiment of the present invention. For example, the pilot patterns allocated for Users 1 to 9 in one frame can be applied to the data burst region as illustrated in FIG. 3. That is, for example, the pilot patterns illustrated in FIGS. 3A to 3C can be applied to Pilot Patterns 1 to 3 illustrated in FIGS. 4A and 4B.

Because a common message region of the downlink frame illustrated in FIG. 4A is associated with symbols in which information to be commonly received by all users, that is, all MSs, is transmitted, pilot distribution density control in accordance with the embodiment of the present invention is not made in the common message region, and the conventional pilot mapping process taking into account the worst case is made therein. Similarly, pilot distribution density control in accordance with the embodiment of the present invention is not made in a common control region of the uplink frame illustrated in FIG. 4B, and the conventional pilot mapping process taking into account the worst case is made therein.

Figure 6:
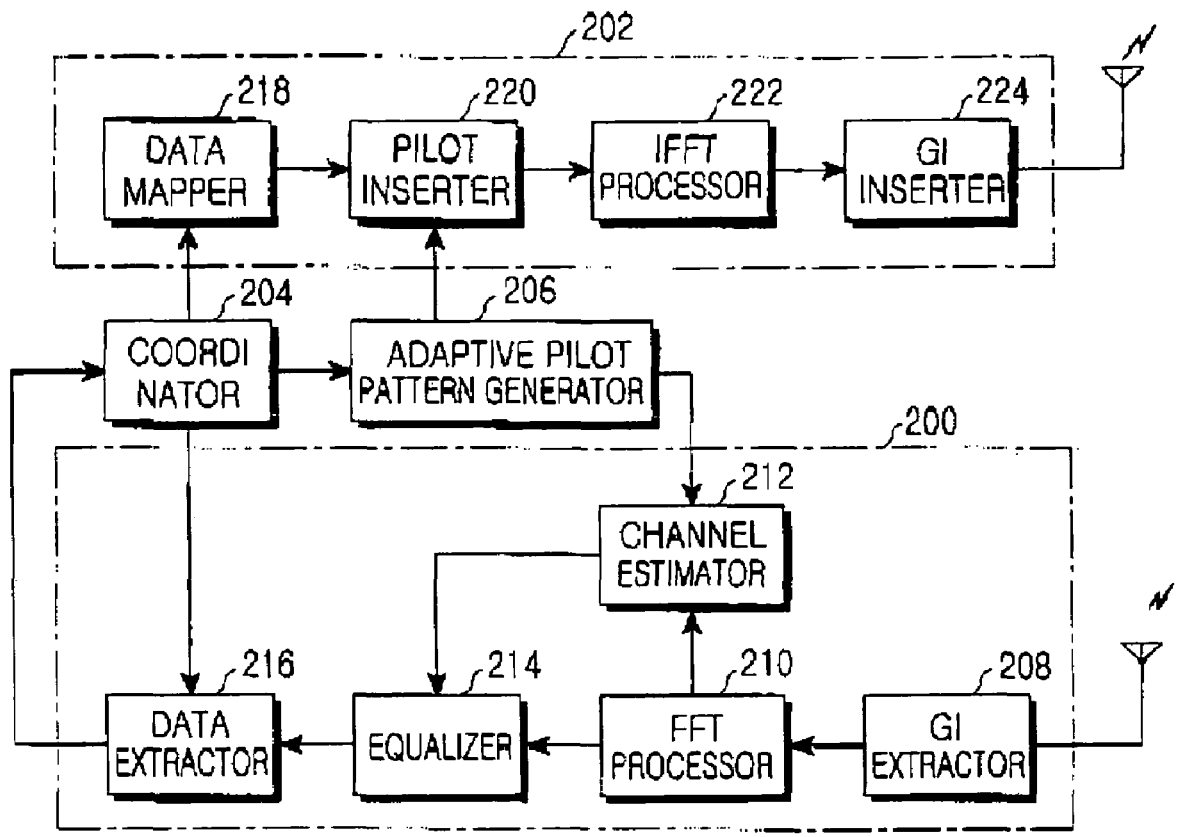
FIG. 6 is a block diagram illustrating a transceiver of a base station (BS) in accordance with an embodiment of the present invention.

FIG. 6 is a block diagram illustrating a transceiver of the BS in accordance with an embodiment of the present invention. The BS transceiver of the present invention includes a coordinator 204 and an adaptive pilot pattern generator 206 as well as a receiver 200 and a transmitter 202 configuring the conventional OFDM BS transceiver. A pilot generator for generating pilots based on a fixed pattern adopted in the conventional OFDM BS transceiver is replaced with the adaptive pilot pattern generator 206.

The receiver 200 and the transmitter 202 will be briefly described such that the present invention can be better understood. In the receiver 200, a symbol obtained by a radio frequency (RF) receiver (not shown) from a signal received from an MS through an antenna is input into a guard interval (GI) extractor 208. A cyclic prefix (CP) inserted by a transmitting side is removed from the symbol input into the GI extractor 208. The symbol from which the CP has been removed is input into a fast Fourier transform (FFT) processor 210, and is fast Fourier transformed. The fast Fourier transformed symbol is applied to a channel estimator 212 and an equalizer 214. The equalizer 214 compensates a fast Fourier transformed data signal for channel distortion according to a channel value estimated by the channel estimator 212. A data extractor 216 recovers original data from the data signal in which the compensation for the channel distortion has been made.

In the transmitter 202, a data mapper 218 maps, data to be transmitted to an MS, to a data burst region of a downlink frame. A pilot inserter 220 inserts pilots into an output of the data mapper 218. A signal in which the data and pilot mapping has been made is inverse fast Fourier transformed by an inverse fast Fourier transform (IFFT) processor 222. A CP is inserted into the inverse fast Fourier transformed signal by a GI inserter 224. An RF transmitter (not shown) transmits an output signal of the GI inserter 224 to the MS through an antenna.

Figure 7:
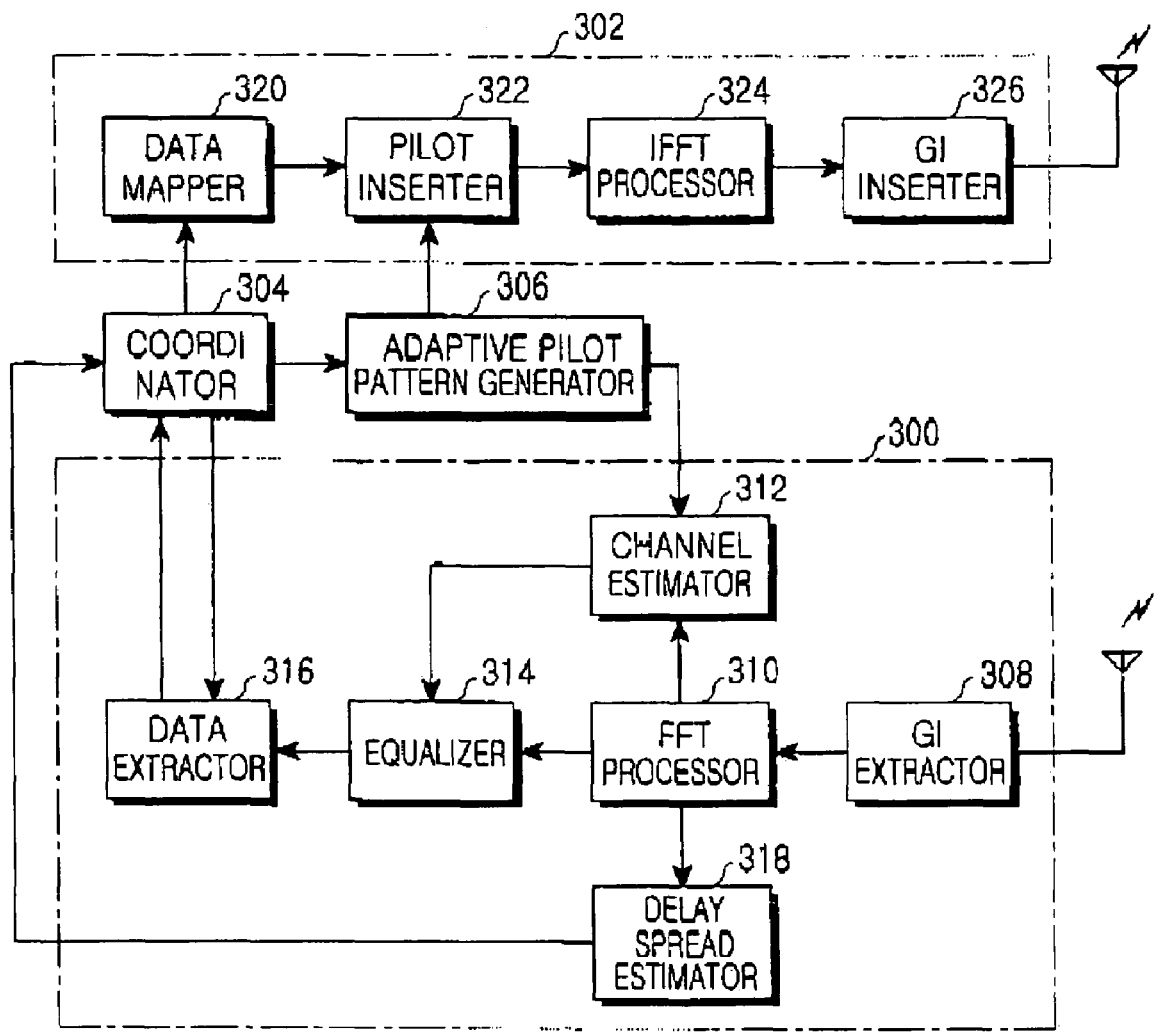
FIG. 7 is a block diagram illustrating a transceiver of a mobile station (MS) in accordance with an embodiment of the present invention.

FIG. 7 is a block diagram illustrating a transceiver of the MS in accordance with an embodiment of the present invention. The MS includes a coordinator 304 and an adaptive pilot pattern generator 306 as well as a receiver 300 and a transmitter 302 configuring the conventional OFDM MS transceiver. A pilot generator for generating pilots of a fixed pattern adopted in the conventional OFDM MS transceiver is replaced with the adaptive pilot pattern generator 306.

The receiver 300 and the transmitter 302 will be briefly described such that the present invention can be better understood. In the receiver 300, a symbol obtained by an RF receiver (not shown) from a signal received from a BS through an antenna is input into a GI extractor 308. A CP inserted by a transmitting side is removed from the symbol input into the GI extractor 308. The symbol from which the CP has been removed is input into an FFT processor 310, and is fast Fourier transformed. The fast Fourier transformed symbol is applied to a channel estimator 312, an equalizer 314, and a delay spread estimator 318. The equalizer 314 compensates a fast Fourier transformed data signal for channel distortion according to a channel value estimated by the channel estimator 312. The data extractor 316 recovers original data from the data signal in which the compensation for the channel distortion has been made. The delay spread estimator 318 measures a multipath delay by performing delay spread estimation. A delay spread value obtained by the delay spread estimation is the measured multipath delay. The delay spread value obtained by the delay spread estimation can include a mean root mean square (RMS) delay spread and a maximum delay spread. The delay spread estimation can be performed using a preamble of a downlink frame. When the downlink frame has a structure of a midamble or postamble, the delay spread estimation can be performed using any one of the midamble and the postamble.

In the transmitter 302, a data mapper 320 maps, data to be transmitted to the BS, to a data burst region of an uplink frame. A pilot inserter 322 inserts pilots into an output of the data mapper 320. A signal in which the data and pilot mapping has been made is inverse fast Fourier transformed by an inverse fast Fourier transform (IFFT) processor 324. A CP is inserted into the inverse fast Fourier transformed signal by a GI inserter 326. An RF transmitter (not shown) transmits an output signal of the GI inserter 326 to the BS through an antenna.

In the BS transceiver illustrated in FIG. 6, the coordinator 204 maps common message information, data, and pilots to the downlink frame. The coordinator 204 obtains channel environment information from a signal transmitted by the MS through the data extractor 216, and controls the data mapper 218 and the adaptive pilot pattern generator 206 to map the data and pilots according to the obtained channel environment information. Each MS notifies the BS of the channel environment information indicating its own channel environment. The channel environment information includes multipath delay information or pilot pattern information.

In the MS transceiver illustrated in FIG. 7, the coordinator 304 controls the data mapper 320 and the adaptive pilot pattern generator 306 correspondingly to a delay spread value obtained by the delay spread estimator 318, that is, a multipath delay, thereby controlling a pilot distribution density of a signal to be transmitted to the BS. The coordinator 304 relatively raises the pilot distribution density when the multipath delay is large, but relatively lowers the pilot distribution density when the multipath delay is small. For example, as illustrated in FIG. 3, the pilot distribution density control based on the multipath delay is made by selecting a pilot pattern mapped to the measured multipath delay among predefined pilot patterns. Of course, the pilot distribution density control is applied only in the data burst region rather than the common control region of an uplink frame.

The coordinator 304 controls the pilot pattern generator 306 to generate pilots according to the pilot pattern selected by the multipath delay such that the pilot inserter 322 inserts the generated pilots into a signal to be transmitted. Moreover, the coordinator 304 controls the data mapper 320 to map data to remaining subcarriers other than subcarriers mapped to the pilots. The coordinator 304 maps the data and pilots to a data burst interval designated by the BS in the data burst region of the uplink frame.

The coordinator 304 transmits the multipath delay information or pilot pattern information serving as the channel environment information indicating a channel environment of the MS to the BS through the common control region of the uplink frame. It is determined whether the coordinator 304 transmits the multipath delay information or the pilot pattern information to the BS, according to the need when the present invention is applied.

The multipath delay information is information indicating a multipath delay measured from a signal received from the BS by the delay spread estimator 318. When transmitting the multipath delay information to the BS, the coordinator 304 transmits a measured delay spread value itself or a representative value corresponding thereto serving as the multipath delay information. The coordinator 304 determines whether to transmit the measured delay spread value or the representative value corresponding thereto serving as the multipath delay information, according to the need when the present invention is applied.

The pilot pattern information indicates a pilot pattern selected by the measured multipath delay among predefined pilot patterns such that the MSs have different pilot distribution densities as illustrated in FIG. 3. That is, the MS notifies the BS of information indicating a pilot pattern a signal to be transmitted is mapped to.

Using the uplink frame, the BS designates slots for the channel environment information and data to be transmitted from the MS, that is, a position of the channel environment information to be transmitted in the common control region and a data burst interval for data to be transmitted. The coordinator 204 of the BS generates information indicating a position of the channel environment information to be transmitted from the MS, and a position of a transmission signal in which data and pilots are mapped. The data mapper 218 maps the generated information to the common message region of the downlink frame and transmits a result of the mapping to the MS. Accordingly, the coordinator 304 of the MS can identify a position of the channel environment information to be transmitted in the common control region and a data burst interval through the data extractor 316 by decoding the common message region of the downlink frame.

In the BS transceiver of FIG. 6, the coordinator 204 obtains the channel environment information transmitted from the MS, that is, the multipath delay information or pilot pattern information, through the data extractor 216 by decoding the common control region of the uplink frame. When the MS is set to transmit the multipath delay information serving as the channel environment information to the BS, the coordinator 204 controls the pilot distribution density of a signal to be transmitted to a corresponding MS by controlling the data mapper 218 and the adaptive pilot pattern generator 206 according to the multipath delay information received from the MS. The coordinator 204 relatively raises the pilot distribution density when the multipath delay is large, but relatively lowers the pilot distribution density when the multipath delay is small. For example, (as illustrated in FIG. 3), the pilot distribution density control based on the multipath delay is made by selecting a pilot pattern mapped to the measured multipath delay among predefined pilot patterns.

On the other hand, when the MS is set to transmit the pilot pattern information serving as the channel environment information to the BS, the coordinator 204 controls the pilot distribution density of a signal to be transmitted to a corresponding MS by controlling the data mapper 218 and the adaptive pilot pattern generator 206 according to the pilot pattern information received from the MS.

The coordinator 204 controls the pilot pattern generator 206 to generate pilots according to the selected pilot pattern such that the pilot inserter 220 inserts the generated pilots into a signal to be transmitted. Moreover, the coordinator 204 controls the data mapper 218 to map data to remaining subcarriers other than subcarriers mapped to the pilots.

The coordinator 204 can select a pilot pattern mapped to a multipath delay received from the MS or a pilot pattern indicated by pilot pattern information received from the MS, or can select a pilot pattern different from that of the MS. When selecting a pilot pattern different from that of the MS, the BS, for example, groups the MSs on a channel environment-by-environment basis according to multipath delays, that is, multipath delay sizes indicated by multipath delay information or pilot pattern information, and allocates pilot patterns to a downlink frame on a group-by-group basis as illustrated in FIG. 2.

Figure 5:
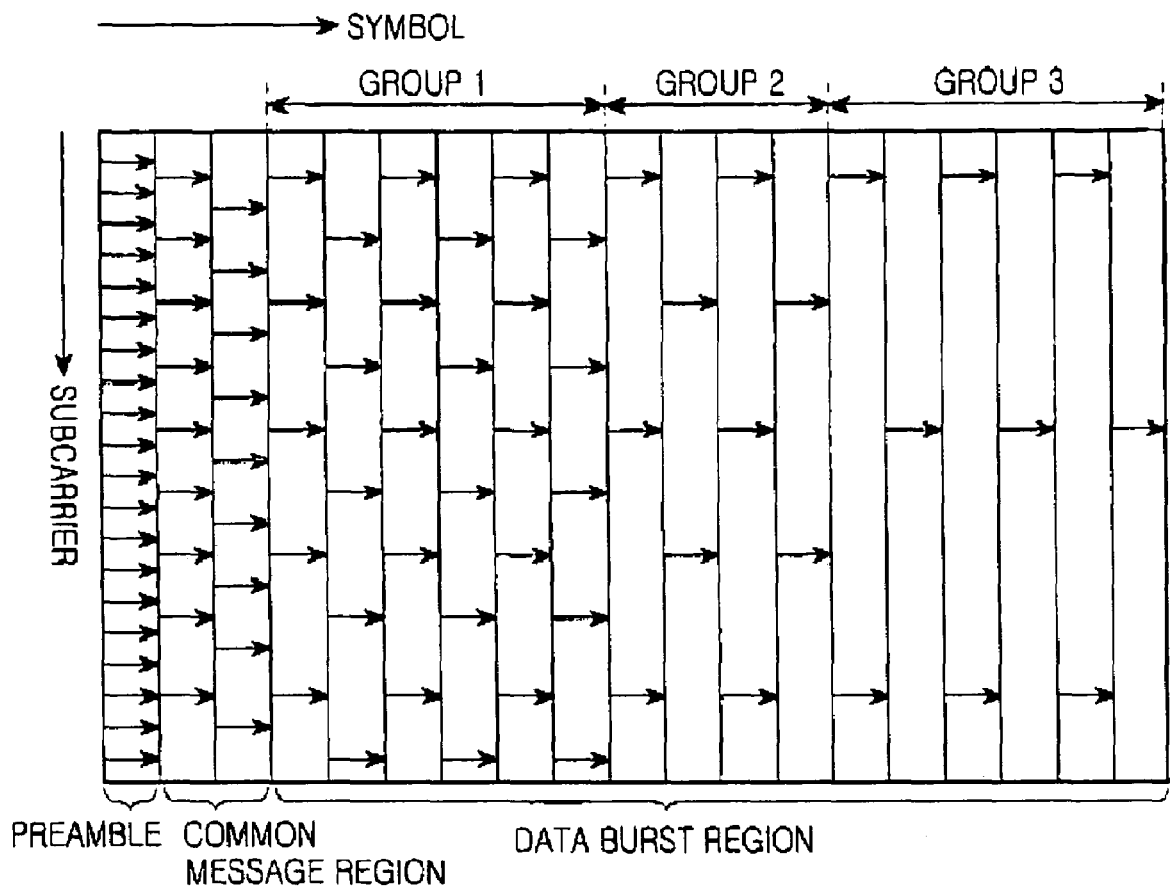
FIG. 5 illustrates an example of a downlink frame structure based on pilot patterns allocated on a group-by-group basis in accordance with an embodiment of the present invention.

In this case, the BS maps, to a signal to be transmitted to each MS, pilots based on a pilot pattern associated with a group to which a corresponding MS belongs among the exemplary pilot patterns illustrated in FIG. 3. An example of a downlink frame structure based on pilot patterns allocated on a group-by-group basis is illustrated in FIG. 5 when an example of grouping the MSs into three groups as illustrated in FIG. 2 is applied. In FIG. 5, short arrows indicate pilots, and a space between the arrows is used to allocate data to be transmitted. A data burst interval in which greater number of arrows are used to allocate pilots to the MS group associated with a larger multipath delay (e.g., group 100 in FIG. 2). A data burst interval in which fewer arrows are used to allocate pilots to the MS group associated with a smaller multipath delay (e.g., group 104 in FIG. 2).

A process for grouping the MSs and controlling the pilot distribution density group-by-group is simpler than a process for individually controlling the pilot distribution density MS-by-MS. That is, a pilot pattern is not changed in a data burst interval for transmitting data to the MSs belonging to one group, and the coordinator 204, the adaptive pilot pattern generator 206, the data mapper 218, and the pilot inserter 220 operate according to the same pilot pattern.

Figure 8:
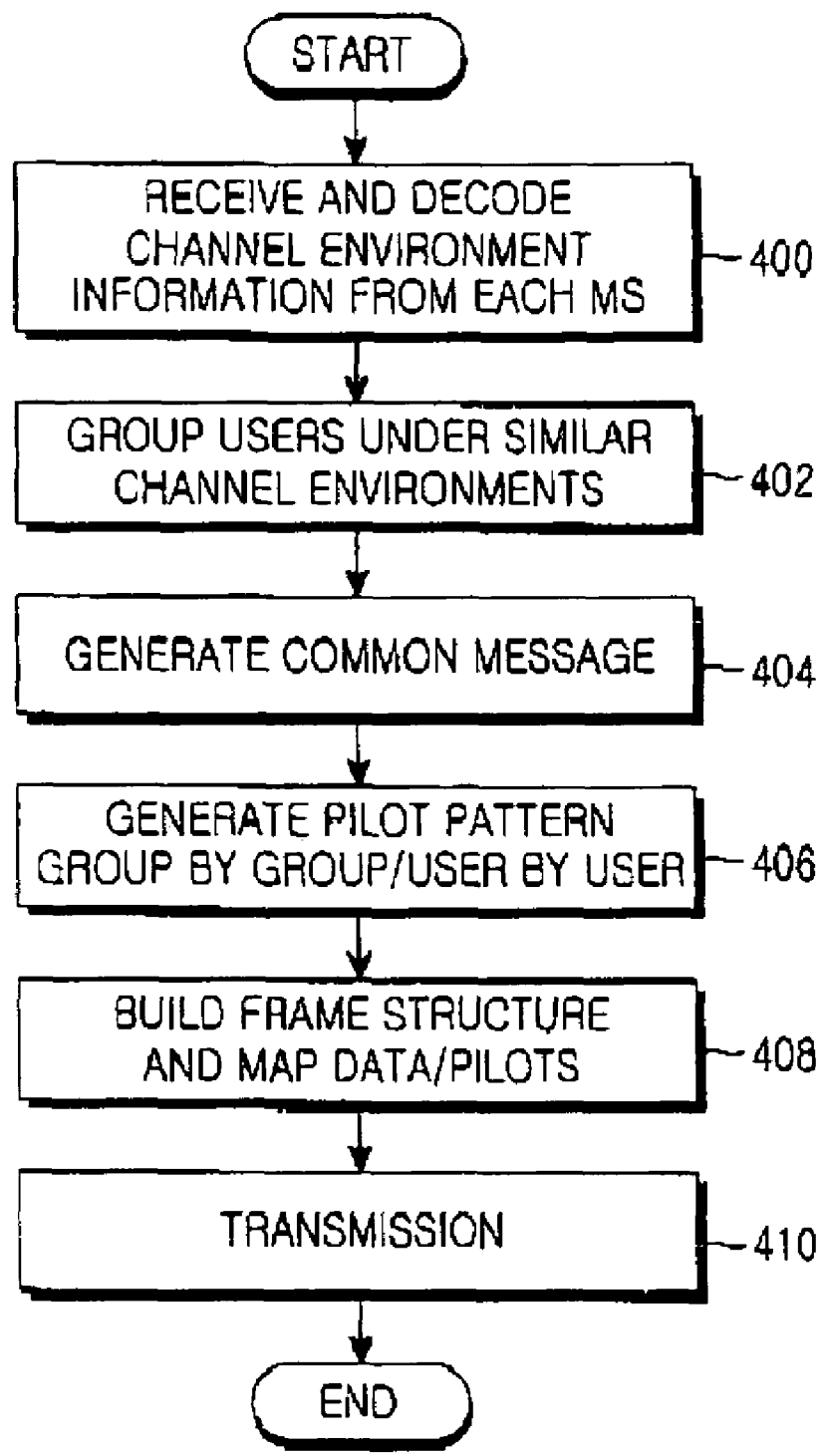
FIG. 8 is a flow chart illustrating a process of the BS in accordance with an embodiment of the present invention.

FIG. 8 is a flow chart illustrating a process of the BS in accordance with an embodiment of the present invention. The coordinator 204 decodes channel environment information of each MS through a common control region of an uplink frame in step 400. The BS groups users, that is, MSs, under similar channel environments according to the channel environment information, that is, multipath delay information or pilot pattern information, in step 402. When the pilot distribution density is controlled MS-by-MS rather than group-by-group, step 402 is omitted. The BS generates information to be commonly received by all the MSs in step 404. The BS generates a pilot pattern associated with a group or MS through the adaptive pilot pattern generator 206 in step 406. The BS builds a downlink frame structure and simultaneously performs data and pilot mapping in step 408. A signal in which the mapping has been made is transmitted to the MSs according to an OFDM modulation technique in step 410.

Figure 9:
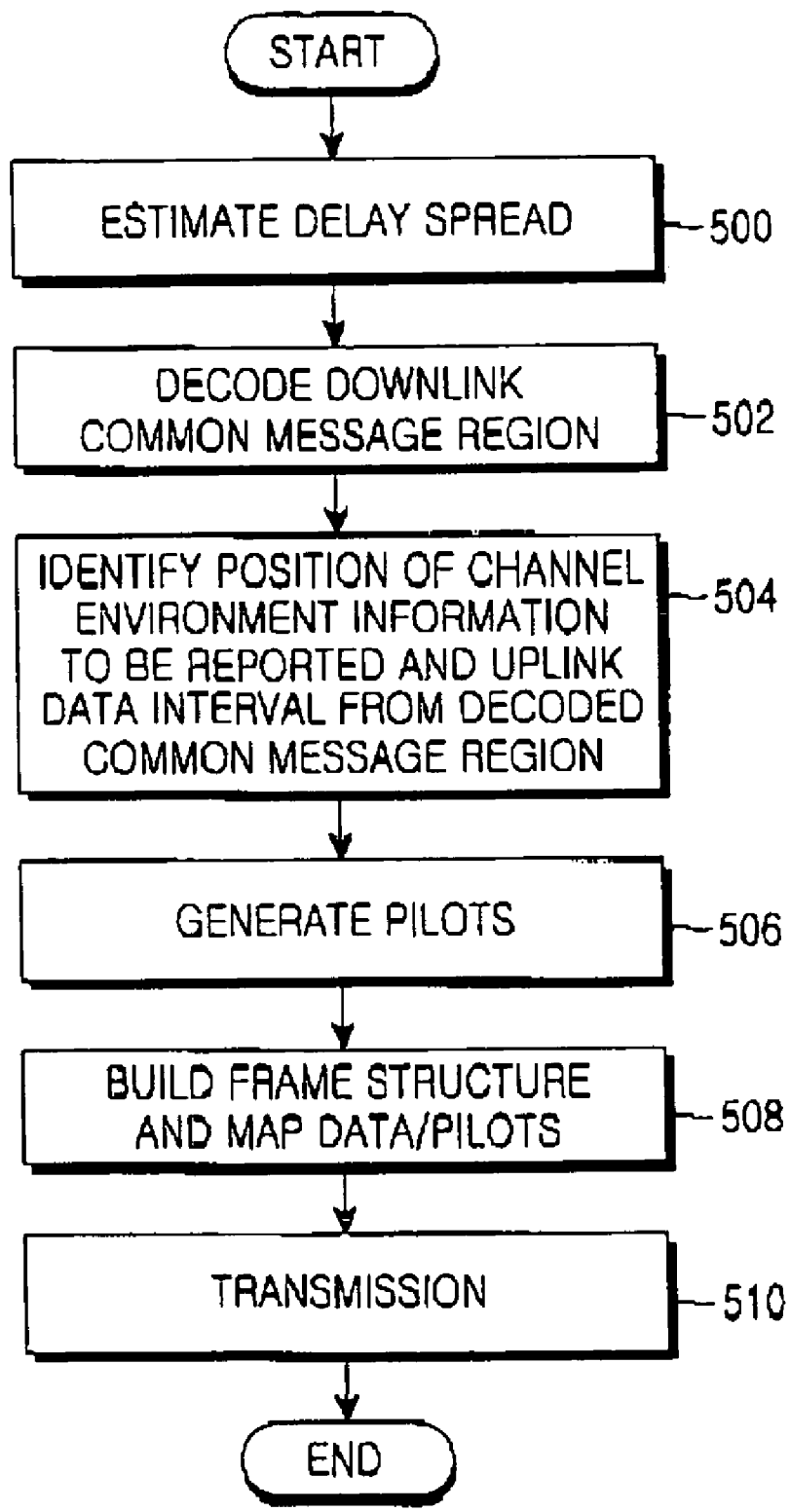
FIG. 9 is a flow chart illustrating a process of the MS in accordance with an embodiment of the present invention.

FIG. 9 is a flow chart illustrating a process of the MS in accordance with an embodiment of the present invention. The MS measures a multipath delay according to delay spread estimation through the delay spread estimator 318 in step 500. The MS decodes a common message region of a downlink frame in step 502. The MS identifies a position of its own channel environment information to be reported and a data burst interval available for its own uplink frame from the decoded common message region. The coordinator 304 generates pilots of a pilot pattern mapped to the currently measured multipath delay through the adaptive pilot generator 306 in step 506. The coordinator 304 maps the data and pilots to the data burst interval of the uplink frame in step 508. A signal in which mapping has been made is transmitted to the BS according to an OFDM modulation technique in step 510.

A predetermined number of pilots for channel estimation are inserted and transmitted according to a channel environment of each MS. Accordingly, fewer pilots need to be transmitted under the better channel environment, but an increased number of pilots can be transmitted under a worse channel environment. As compared with the conventional case where a fixed number of pilots based on the worst channel environment are transmitted, the present invention can effectively utilize resources for data burst transmission, that is, subcarriers, thereby improving the total throughput.

For illustration (with references to Tables 1 and 2 shown below), the throughput in accordance with an embodiment of the present invention is compared with the throughput according to the prior art. First, it is assumed that a pilot is inserted into each symbol in an environment robust to the Doppler frequency, and channel estimation and interpolation for compensating for channel distortion are performed in units of symbols. The maximum delay spread is different according to channel environments. For example, with reference to Table 1 it is assumed that Channels A, B, C, and D have the maximum delay spread values of 12.8 µs, 6.4 µs, 3.2 µs, and 1.6 µs according to the channel environments, respectively, and an amount of information added in accordance with the present invention in the common message region is negligible. Moreover, it is assumed that a bandwidth is 10 MHz, the number of data subcarriers available within one symbol duration according to FFT is 1,024, and the number of symbols other than symbols of the preamble and the common message region in the downlink frame is 20.

According to the conventional technique for allocating a fixed number of pilots regardless of a channel environment, pilots are allocated every four subcarriers. In this case, the maximum delay spread value according to the worst channel environment is 12.8 μs, the number of allocated pilots per symbol is 256, the number of data subcarriers per symbol is 768 (=1,024−256), the number of data subcarriers per frame is 15,360 (=768×20), and the number of pilots per frame is 5,120 (=256×20).

In relation to the present invention, three comparative examples are provided according to distributions of the above-mentioned four channels, that is, Channels A to D. Comparative Example 1 is a case where only the best channel is present for one frame, that is, the percentage of Channel D is 100%. Comparative Example 2 is a case where Channels A to D have a uniform distribution for one frame, that is, the percentages of Channels A to D are 25%, respectively. Comparative Example 3 is a case where Channels A to D have a triangular distribution, that is, the percentages of Channels A to D are 10%, 40%, 40%, and 10%, respectively.

When it is assumed that an example of computing the throughput of the present invention is Comparative Example 3, an example of comparing Comparative Example 3 with the prior art will be described in the following. First, Groups 1 to 4 are respectively associated with Channels A to D as seen from Table 1 below.

TABLE 1

| Group | Delay spread | Distribution percentage | Number of pilots per symbol | Number of data subcarriers per symbol |
|---|---|---|---|---|
| 1 | 12.8 μs~6.4 μs | 10% | 256 | 768 |
| 2 | 6.4 μs~3.2 μs | 40% | 128 | 896 |
| 3 | 3.2 μs~1.6 μs | 40% | 64 | 960 |
| 4 | 1.6 μs~0 μs | 10% | 32 | 992 |

According to Table 1, the total number of data subcarriers per frame is 18,368 (=768×2+896×8+960×8+992×2), and the total number of pilots per frame is 2,112(=256×2+128×8+64×8+32×2).

Accordingly, an increase percentage of data subcarriers is 19.6% (=(18,368−15,360)/15,360×100).

TABLE 2

| | Prior art | Present invention | | | Worst case |
|---|---|---|---|---|---|
| | | Comparative Example 1 | Comparative Example 2 | Comparative Example 3 | |
| Data tone percentage | 75% | 96.8% | 88.3% | 89.7% | 75% |
| Pilot tone percentage | 25% | 3.2% | 11.7% | 10.3% | 25% |
| Increase percentage of data subcarriers | — | 29.2% | 17.7% | 19.6% | 0% |

As seen from Table 2, the percentage of data subcarriers can be increased by up to a maximum of 29.2% in terms of throughput. In this case, all MS can smoothly perform a communication function under the best channel environment, and the increase percentages of resources in the uniform distribution and the triangular distribution are 17.7% and 19.6%, respectively.

The arrangement and the number of pilots associated with a multipath delay are adaptively controlled along the subcarrier axis, such that performance loss is minimized, resources are effectively utilized, and the total throughput is increased. That is, the pilot distribution density is controlled in terms of resources allocated MS by MS, such that throughput is increased, and power consumption required for computing user-by-user channel estimates is reduced. The arrangement and the number of pilots associated with multipath delay in both the downlink and the uplink are adaptively controlled along the subcarrier axis, such that the entire system throughput can be increased.

Although preferred embodiments of the present invention have been disclosed for illustrative purposes, those skilled in the art will appreciate that various modifications, additions and substitutions are possible, without departing from the scope of the present invention. More specifically, an example in which the present invention is applied to an orthogonal frequency division multiplexing (OFDM) system has been described in the embodiment of the present invention. Of course, the present invention can be applied to any pilot-aided channel estimation system as well as an orthogonal frequency division multiple access (OFDMA) system based on OFDM. Therefore, the present invention is not limited to the above-described embodiments, but is defined by the following claims, along with their full scope of equivalents.

What is claimed is:

1. An apparatus for adaptively allocating pilots in a base station (BS) of a communication system, comprising:
    a data mapper for mapping, to a data burst interval of a downlink frame, data to be transmitted to at least one mobile station (MS);
    an adaptive pilot pattern generator for generating pilots according to a designated pilot pattern;
    a pilot inserter for inserting the pilots generated by the adaptive pilot pattern generator into an output of the data mapper; and
    a coordinator for controlling the data mapper and the adaptive pilot pattern generator according to information, received from the at least one MS, indicating a multipath delay between the BS and the at least one MS, relatively raising a distribution density of pilots of a signal to be transmitted to the at least one MS when the multipath delay is large, and relatively lowering the pilot distribution density when the multipath delay is small.

2. The apparatus according to claim 1, wherein the coordinator groups a plurality of MSs corresponding to multipath delay information received therefrom to set an arrangement in a downlink frame on a group by group basis, and sets the pilot distribution density of the signal to be transmitted to each MS correspondingly to a group to which a corresponding MS belongs.

3. The apparatus according to claim 2, wherein the coordinator maps, to the signal to be transmitted to a group having the large multipath delay, the pilots according to a pilot pattern having a higher pilot distribution density among predefined pilot patterns having different pilot distribution densities, and maps, to the signal to be transmitted to a group having the small multipath delay, the pilots according to a pilot pattern having a lower pilot distribution density among the predefined pilot patterns.

4. The apparatus according to claim 3, wherein the coordinator generates information indicative of the pilot pattern mapped to each MS, the pilot pattern information being mapped to a common message region of the downlink frame by the data mapper and transmitted to each MS.

5. The apparatus according to claim 3, wherein the pilot patterns arranged along a subcarrier axis have a different number of pilots.

6. The apparatus according to claim 1, wherein the coordinator generates information designating a position of the multipath delay information to be transmitted in a common control region of an uplink frame, the generated information is mapped to a common message region of a downlink frame by the data mapper and transmitted to the at least one MS, and the multipath delay information transmitted by the at least one MS is decoded from the common control region of the uplink frame.

7. The apparatus according to claim 1, wherein the multipath delay information indicates a delay spread value measured by estimating a delay spread of the signal received by the at least one MS from the BS.

8. An apparatus for adaptively allocating pilots in a mobile station (MS) of a communication system, comprising:
- a delay spread estimator for estimating a delay spread of a signal received from a base station (BS);
- a data mapper for mapping, to a data burst interval of an uplink frame, data to be transmitted to the BS;
- an adaptive pilot pattern generator for generating pilots according to a designated pilot pattern;
- a pilot inserter for inserting the pilots generated by the adaptive pilot pattern generator into an output of the data mapper; and
- a coordinator for controlling the data mapper and the adaptive pilot pattern generator according to a multipath delay measured by the delay spread estimator, by increasing a distribution density of pilots of a signal to be transmitted to the BS when the multipath delay is large, and by decreasing the pilot distribution density when the multipath delay is small.

9. The apparatus according to claim 8, wherein the coordinator maps, to the signal to be transmitted, the pilots according to a pilot pattern having a higher pilot distribution density among predefined pilot patterns having different pilot distribution densities when the multipath delay is larger, and maps, to the signal to be transmitted, the pilots according to a pilot pattern having a lower pilot distribution density among the predefined pilot patterns when the multipath delay is smaller.

10. The apparatus according to claim 9, wherein the coordinator controls the data mapper to map information indicative of the multipath delay to a common control region of the uplink frame and to transmit a result of the mapping to the BS.

11. The apparatus according to claim 9, wherein the coordinator receives, from the BS through a common message region of a downlink frame, information designating a position of multipath delay information to be transmitted in a common control region of the uplink frame.

12. The apparatus according to claim 9, wherein the pilot patterns arranged along a subcarrier axis have a different number of pilots.

13. The apparatus according to claim 9, wherein the coordinator controls the data mapper to map, to a common control region of the uplink frame, information indicative of a pilot pattern mapped to the signal to be transmitted, and to transmit a result of the mapping to the BS.

14. The apparatus according to claim 13, wherein the coordinator receives, from the BS through a common message region of a downlink frame, information designating a position of the pilot pattern information to be transmitted in the common control region of the uplink frame.

* * * * *

UNITED STATES PATENT AND TRADEMARK OFFICE
CERTIFICATE OF CORRECTION

PATENT NO. : 7,634,014 B2
APPLICATION NO. : 11/325125
DATED : December 15, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this

Ninth Day of November, 2010

David J. Kappos
*Director of the United States Patent and Trademark Office*